(12) United States Patent
Gomi et al.

(10) Patent No.: US 6,377,014 B1
(45) Date of Patent: Apr. 23, 2002

(54) LEGGED WALKING ROBOT

(75) Inventors: Hiroshi Gomi; Kazushi Hamaya, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/636,750

(22) Filed: Aug. 11, 2000

(30) Foreign Application Priority Data

Nov. 5, 1999  (JP) ............................................ 11-315195

(51) Int. Cl.$^7$ ................................................. B25J 5/00
(52) U.S. Cl. ............................. 318/568.12; 318/568.22; 901/1; 901/48; 901/50
(58) Field of Search ...................... 318/568.1, 568.11, 318/568.12, 568.22; 180/8.1–8.9; 901/1, 3–5, 6–8, 48, 50

(56) References Cited

U.S. PATENT DOCUMENTS

| | | | | |
|---|---|---|---|---|
| 4,051,623 A | * | 10/1977 | Ogawa ............................ | 901/1 |
| 5,255,753 A | * | 10/1993 | Nishikawa et al. ........... | 180/8.1 |
| 5,402,050 A | * | 3/1995 | Ozawa ................... | 318/568.12 |
| 5,416,393 A | * | 5/1995 | Gomi et al. ............ | 318/568.12 |
| 5,455,497 A | * | 10/1995 | Hirose et al. .......... | 318/568.12 |
| 5,838,130 A | * | 11/1998 | Ozawa ................... | 318/568.12 |
| 5,974,366 A | * | 10/1999 | Kawai et al. ........... | 318/568.12 |

FOREIGN PATENT DOCUMENTS

| | | |
|---|---|---|
| EP | 0433091 A2 | 6/1991 |
| EP | 0433091 A3 | 6/1991 |
| EP | 11033941 | 2/1999 |
| JP | 3-184781 | 8/1991 |
| JP | 11-33941 | 2/1999 |

OTHER PUBLICATIONS

European Search Report dated Apr. 5, 2001.

* cited by examiner

Primary Examiner—Marlon T. Fletcher
(74) Attorney, Agent, or Firm—Arent Fox Kintner Plotkin & Kahn, PLLC

(57) ABSTRACT

In a biped walking robot having a body and two articulated legs each connected to the body and each having a foot at its free end such that the robot is controlled to walk by landing a heel of the foot first on a floor. The heel of the foot has projections and packings charged in gaps. The projections are constituted to have high rigidity against forces acting in the direction of the gravity axis and low rigidity, which is lower than the first rigidity, against forces acting in other directions, when the heel is landed, thereby enabling to achieve an optimum balance between absorption/mitigation of shock at footfall and attitude stabilization after footfall.

14 Claims, 11 Drawing Sheets

DIRECTION OF GRAVITY AXIS

LEGGED WALKING ROBOT

BACKGROUND OF THE INVENTION

1. Field of the Invention

This invention relates to a legged walking robot, more particularly to a foot structure of a legged walking robot that effectively absorbs and mitigates shock during walking.

2. Description of the Related Art

Various foot structures have been developed for legged walking robots, particularly for biped walking robots. These include, for example, the structures disclosed by this applicant in Japanese Laid-open Patent Application Nos. Hei. 3(1991)-184781 and Hei. 11(1999)-33941.

The feet of a legged walking robot, particularly those of a biped walking robot, should preferably have an appropriate degree of elasticity for absorbing and mitigating shock at footfall (landing of foot on floor or ground) but also have an appropriate degree of rigidity for maintaining attitude stability after footfall. These properties are, however, incompatible and difficult to achieve simultaneously. The prior art, therefore, has room for improvement regarding this point.

SUMMARY OF THE INVENTION

An object of the invention is, therefore, to overcome this problem of the prior art by providing a legged walking robot particularly, a biped walking robot, having a foot structure which enables it to achieve an optimum balance between absorption/mitigation of shock at footfall and attitude stabilization after footfall.

For realizing this object, the invention provides a legged walking robot having at least a body and a plurality of legs each connected to the body and each having a foot at its free end such that the robot is controlled to walk by landing a heel of the foot first on a floor, wherein the improvement comprises: the heel of the foot is constituted of a first member made of a rigid material and a second member made of a rigid material, and the second member is constituted to have a first rigidity against forces acting in a direction of gravity axis and a second rigidity, which is lower than the first rigidity, against forces acting in a direction other than the direction of gravity axis, when the heel is landed.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of a legged walking robot, more particularly a foot structure of a legged walking robot according to the invention will now be explained with reference to the drawings.

Figure 1:
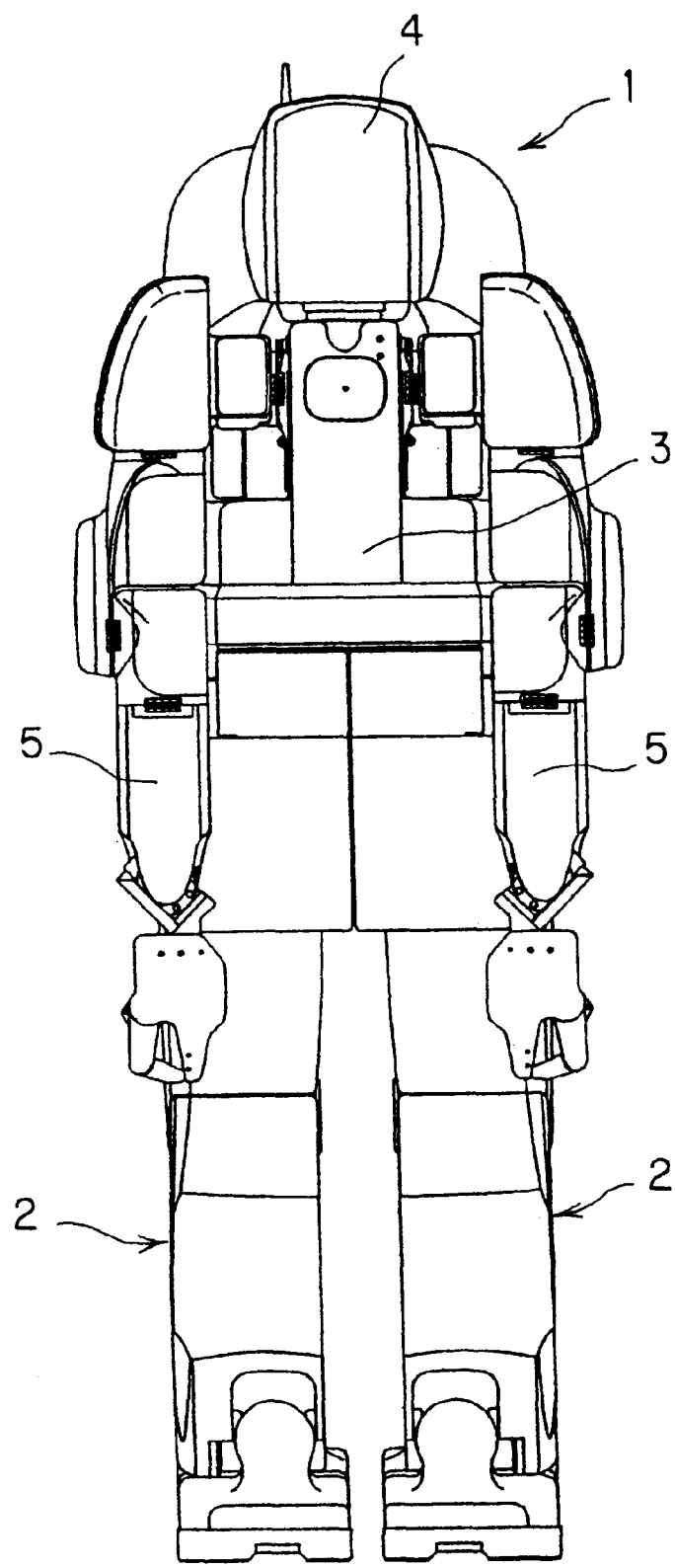
FIG. 1 is a front view of a legged walking robot according to the invention.
Figure 2:
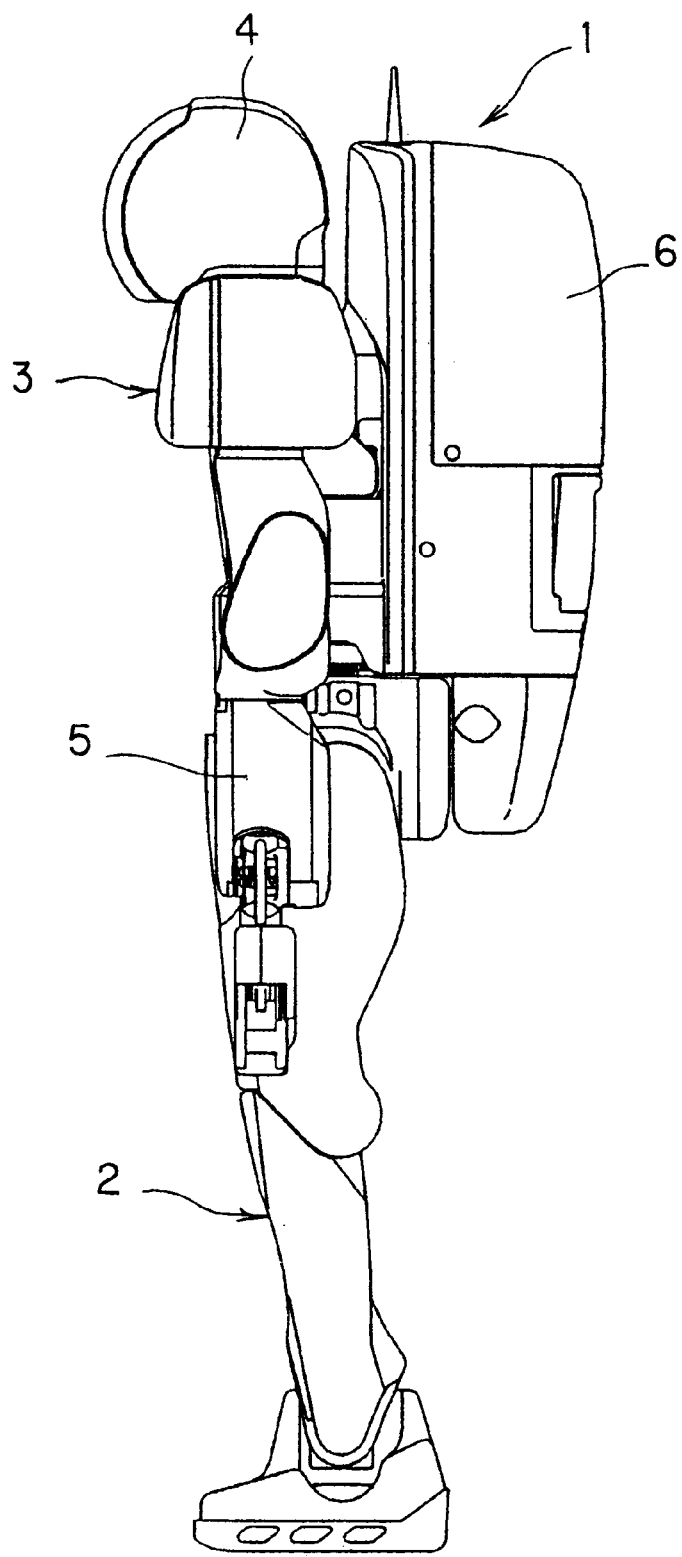
FIG. 2 is a side view of the robot illustrated in FIG. 1.

FIG. 1 is a front view of a legged walking robot, more specifically a biped walking robot, whose foot structure is the characteristic feature of the invention. FIG. 2 is a side view of the same.

As shown in FIG. 1, the legged walking robot (hereinafter referred to as "robot 1") is equipped with a pair of leg links (articulated legs) 2 and a body 3 located above the leg links 2. A head 4 is formed on the upper end of the body 3 and arm links (articulated arms) 5 are connected to opposite sides of the body 3. As shown in FIG. 2, a housing unit 6 is mounted on the back of the body 3 for accommodating, among other things, a control unit (explained later) and a power supply battery for operating the motors that drive the joints of the robot 1.

The internal structure of the robot 1 will now be explained chiefly with reference to FIG. 3.

As illustrated, the robot 1 has right and left leg links 2 each having six joints. (To make the arrangement easier to understand, all of the joints are represented in FIG. 3 as the electric motors by which they are driven.)

The twelve joints are: joints 10R, 10L (R and L indicating the right and left sides) each for swiveling the corresponding leg (around the z axis) of the hip, joints 12R, 12L each for rotation around the roll axis (x axis) of the hip, joints 14R, 14L each for rotation around the pitch axis (y axis) of the hip, joints 16R, 16L each for rotation around the pitch axis (y axis) of the knee, joints 18R, 18L each for rotation around the pitch axis (y axis) of the ankle, and joints 20R, 20L each for rotation around the roll axis (x axis) of the ankle. Feet (foot members) 22R, 22L are attached at the lower ends of the leg links 2.

Thus each leg link 2 comprises the hip (crotch) joints 10R(L), 12R(L) and 14R(L), knee joint 16R(L) and ankle joints 18R(L) and 20R(L). The hip and knee joints are connected by a thigh link 24R(L) and the knee and ankle joints by a shank (crus) link 26R(L).

Figure 3:
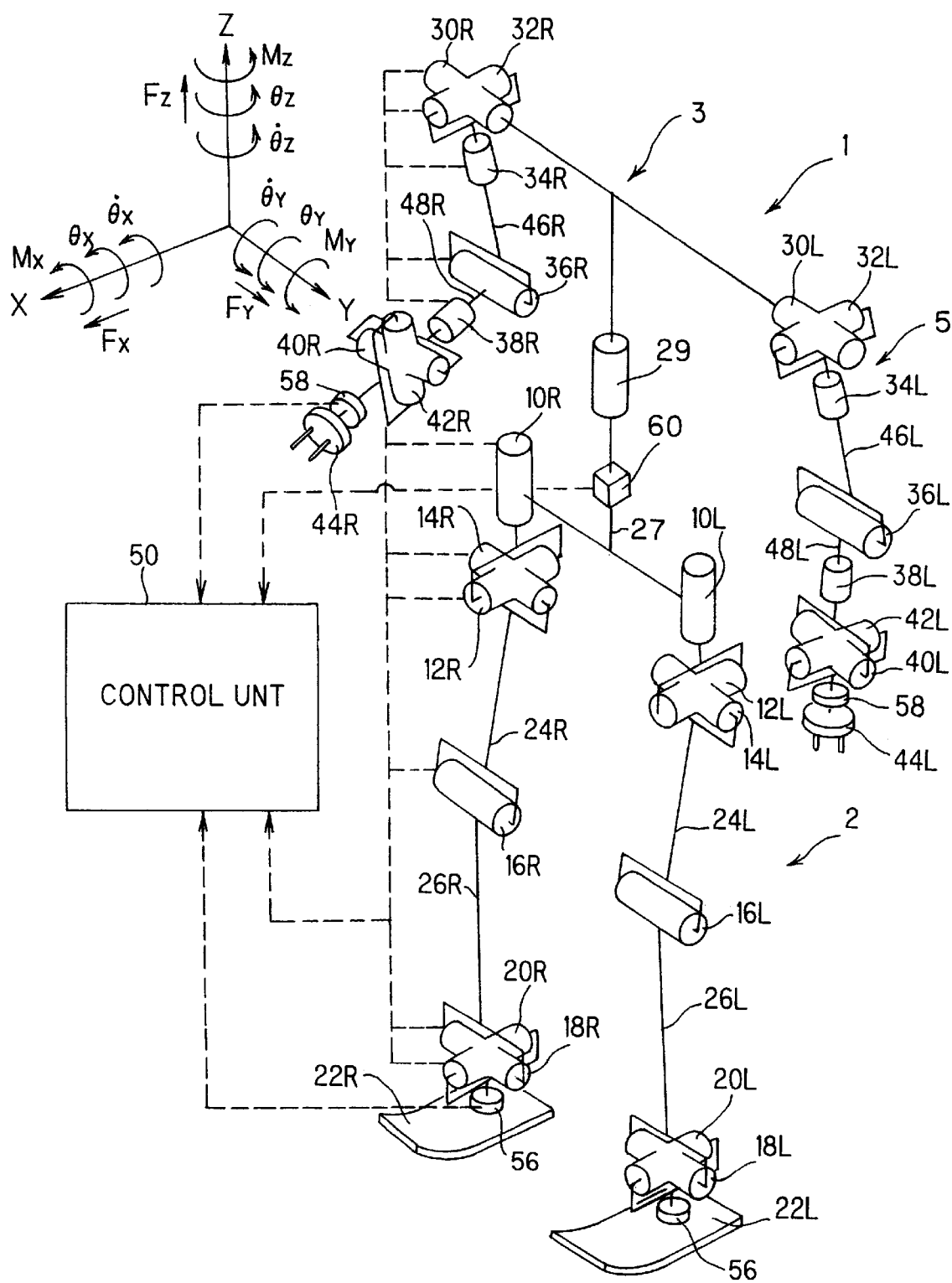
FIG. 3 is a skeleton view of the robot illustrated in FIG. 1 showing the internal structure of the robot.

The leg links 2 are connected through the hip joints to the body 3, which is represented in FIG. 3 simply by the body link 27. The arm links 5 are connected to the body 3, as already mentioned. A joint 29 is provided for swiveling the body around the gravity axis (z or vertical axis).

The arm links 5 comprise joints 30R, 30L each for rotation around the pitch axis of the corresponding shoulder, joints 32R, 32L each for rotation around the roll axis of the shoulder, joints 34R, 34L each for swiveling the arm around the gravity axis, joints 36R, 36L each for rotation around the pitch axis of the elbow, joints 38R, 38L each for swiveling the wrist around the gravity axis, joints 40R, 40L each for rotation of the wrist around the pitch axis, and joints 42R, 42L each for rotation of the wrist around the roll axis. Hands (end effectors) 44R, 44L are attached to the distal ends of the wrists.

Thus each arm link 5 comprises the shoulder joints 30R(L), 32R(L) and 34R(L), elbow joints 36R(L), and the wrist joints 38R(L), 40R(L) and 42R(L). The shoulder joint and the elbow joint are connected by an arm link 46R(L) and the elbow joint and the wrist joint are connected by a forearm link 48R(L).

Owing to the foregoing configuration, the leg links 2 of the right and left legs thus have twelve degrees of freedom in total, so that during locomotion the legs as a whole can be caused to execute the desired movements by driving the 6*2=12 joints to appropriate angles. (The symbol*indicates multiplication in this specification). The robot is thus capable of walking freely within three-dimensional space. Each arm link 5 has seven degrees of freedom. The robot 1 can, therefore, be operated to carry out desired jobs by driving these joints to appropriate angles.

As shown in FIG. 3, a force sensor 56 of conventional design is mounted on the foot 22R(L) below the ankle joint. Of the external forces acting on the robot, the force sensor 56 detects the three ground reaction force components Fx, Fy and Fz and the three moment components Mx, My and Mz acting on the robot 1 along and around three mutually orthogonal axes from the surface of contact.

Further, a similar force sensor 58 is mounted between the wrist joints 38R(L), 40R(L), 42R(L) and the hand 44R(L). The force sensor 58 detects other forces acting on the robot, particularly the three object reaction force components Fx, Fy and Fz and the three moment components Mx, My and Mz acting on the robot along and around three mutually orthogonal axes from the work (object the robot is performing an operation on).

An inclination sensor 60 mounted on the body 3 detects inclination and angular velocity relative to the gravity axis. The outputs of the joint motors are decreased in angular velocity and increased in torque by reduction gears (not shown) and applied for moving the links 24R(L), 26R(L) etc. relative to one another. Each motor is provided with a rotary encoder (not shown) for detecting the amount of motor rotation.

The control unit (designated by reference numeral 50) accommodated in the housing unit 6 as mentioned earlier has a microcomputer. The outputs of the force sensors 56 etc. are forwarded to the control unit 50. (For simplicity of illustration, only the outputs from the right side of the robot 1 are indicated in FIG. 3.). Based on data stored in a memory (not shown) and the detection values, the control unit 50 computes the joint driving manipulated variables and drives the joints.

The structure of the feet 22R, 22L of the robot 1 shown in FIG. 3 will now be explained in detail with reference to FIG. 4 to FIG. 11.

Figure 4:
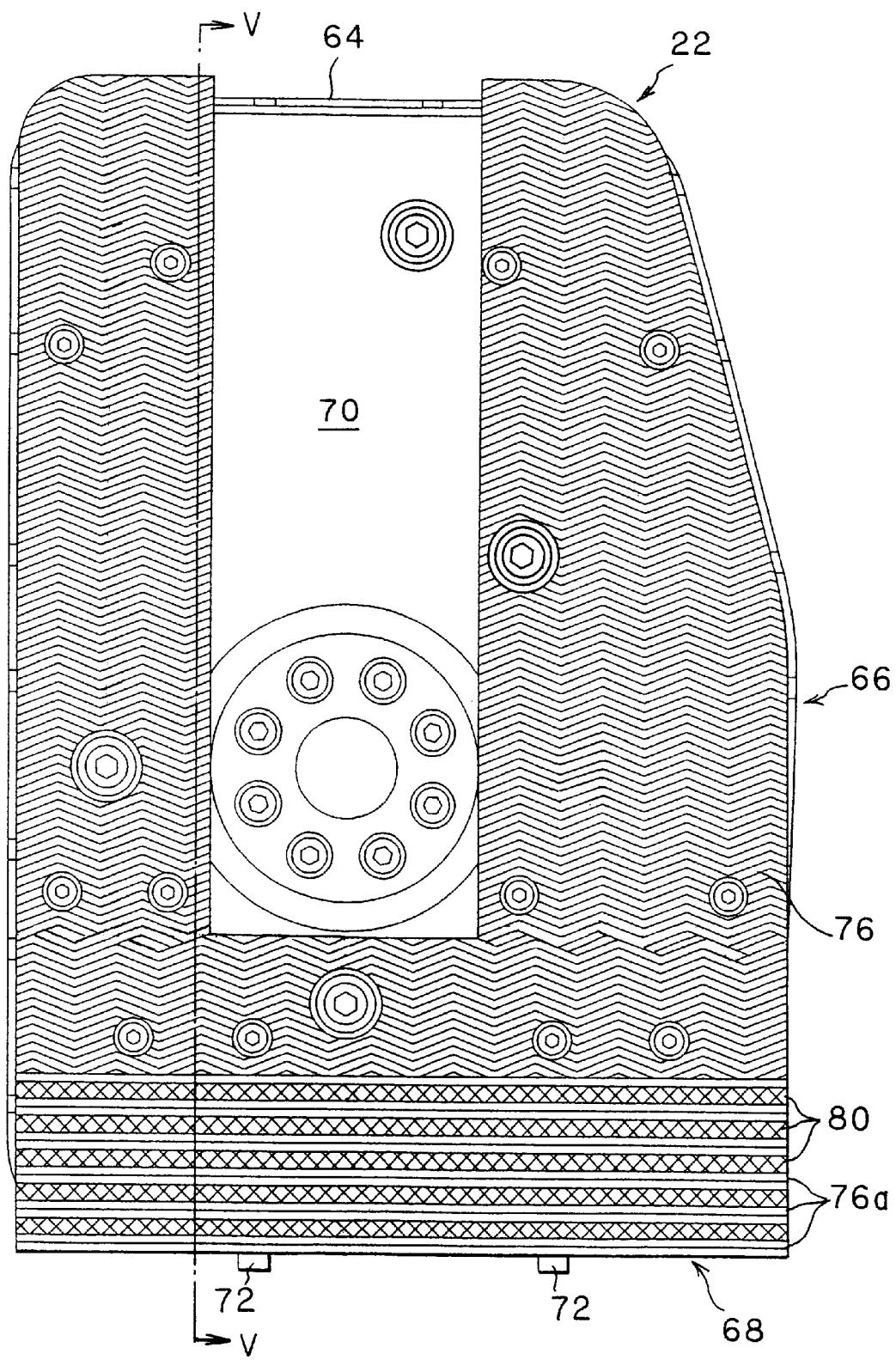
FIG. 4 is a plan view showing the sole of the foot of the robot illustrated in FIG. 1.
Figure 5:
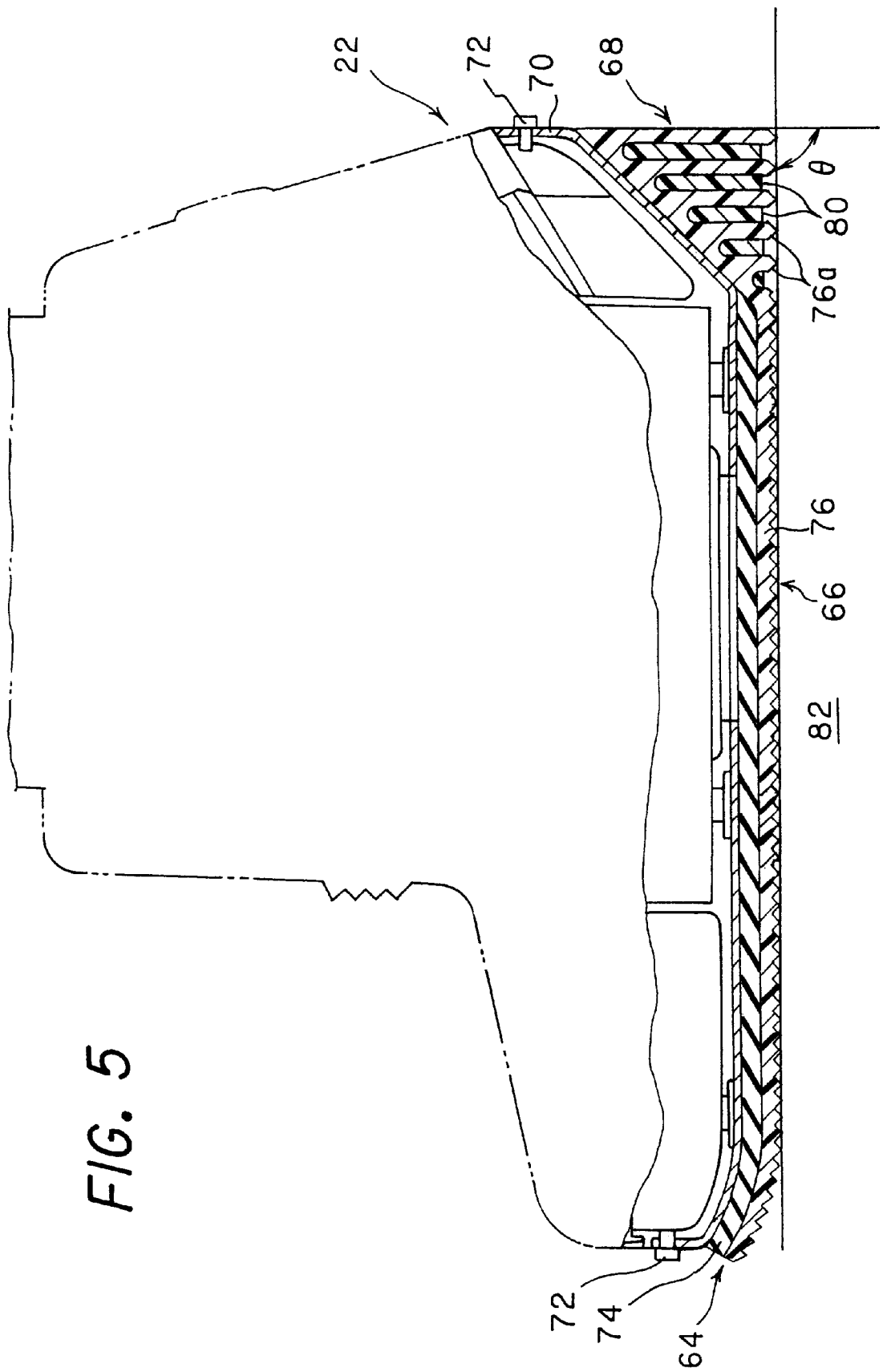
FIG. 5 is a sectional view taken along line V—V of FIG. 4.

FIG. 4 shows the sole (bottom) of one of the aforesaid feet 22. As the two feet 22 are laterally symmetrical, the notation R(L) will be dropped. FIG. 5 is a sectional view taken along line V—V of FIG. 4. Since FIG. 5 to FIG. 8 are views for explaining the sectional structure of the sole region, the remaining portion of the foot 22 is shown only in outline.

As shown in FIG. 4, the sole (bottom surface) of the foot 22 has a generally rectangular shape that gradually tapers laterally (widthwise) toward the toe tip.

As shown in FIG. 5, a relatively thin plate 70 extends over substantially the entire surface of the sole (bottom) of the foot 22 from the toe tip 64 across the flat central portion 66 to the heel 68 at the rear. The plate 70 is detachably fastened to the sole (bottom) by screws 72 at the toe tip 64 and the heel 68.

The plate 70 is curved upward (in the gravity axis direction) toward the toe tip at a curvature such that the ankle joints 18R(L), 20R(L) describe prescribed loci in a sagittal plane parallel to the direction of advance and is similarly curved upward (in the gravity axis direction) at the rear (heel) end to enable smooth landing. The plate 70 is made of aluminum, or a fiber-reinforced resin or other such material with excellent rigidity and low-weight properties.

A first elastic member 74 made of rubber or other elastic material is attached by an appropriate method such as bonding to the outer surface of the plate 70 from the toe tip 64 to the rear end of the flat central portion 66. A second elastic member 76 smaller in thickness than the first elastic member 74 is attached by an appropriate technique such as bonding to the outer surface of the first elastic member 74 over the whole length of the sole, i.e., from the toe tip 64 across the flat central portion 66 onto heel 68.

The first elastic member 74 and the second elastic member 76 (FIG. 5) are not attached to the longitudinal central region extending from the toe tip 64 to around the rear end of the flat central portion 66, as best shown in FIG. 4. The plate 70 is thus exposed at this region.

The second elastic member 76 is formed to be relatively thin up to around the rear end of the flat central portion 66 but is made thick at the heel 68. The thick heel portion is formed with multiple, evenly-spaced projections (second member) 76a projected outwardly from the sole. The illustrated embodiment has five projections 76a.

As best shown in FIG. 5, the angle θ between the projections 76a and the flat central portion 66 is formed to be substantially 90 degrees. In other words, the projections 76a are formed to protrude parallel with the gravity axis toward the floor surface 82 on which the foot 22 lands. This is to maximize the rigidity of the projections 76a against the forces acting thereon in the gravity axis direction and to lower their rigidity against forces acting in other directions. The projections 76a are configured to be comb teeth like when viewed in vertical section as in FIG. 5 and are configured to be straight lines, more precisely lines of a linear series, when viewed from the sole (bottom) as in FIG. 4.

The second elastic member 76 including the projections 76a is made of a relatively (second) rigid material having a hardness of 70 or greater. Suitable materials include rubbers such as NBR (acrylonitrile-butadiene rubber) and plastics.

Packings (first members) 80 are charged into the gaps between the projections 76a. The packings 80 are charged so that their outer surfaces are slightly countersunk relative to the ends of the projections 76a. The projections 76a, therefore, protrude slightly from between the packings 80.

The packings 80 are also made of a (first) rigid material including rubber such as NBR (acrylonitrile-butadiene rubber) or a plastic, but have a lower hardness than the second material constituting the second elastic member 76 including the projections 76a, e.g., a hardness of 55 or less.

Thus in this embodiment the heel 68 of the foot 22 is composed of the second member comprising a plurality of projections 76a and the first member comprising packings 80 and the projections 76a are constituted to have high (first) rigidity against forces acting along the gravity axis and lower (second) rigidity than this against forces acting in other directions.

Figure 6:
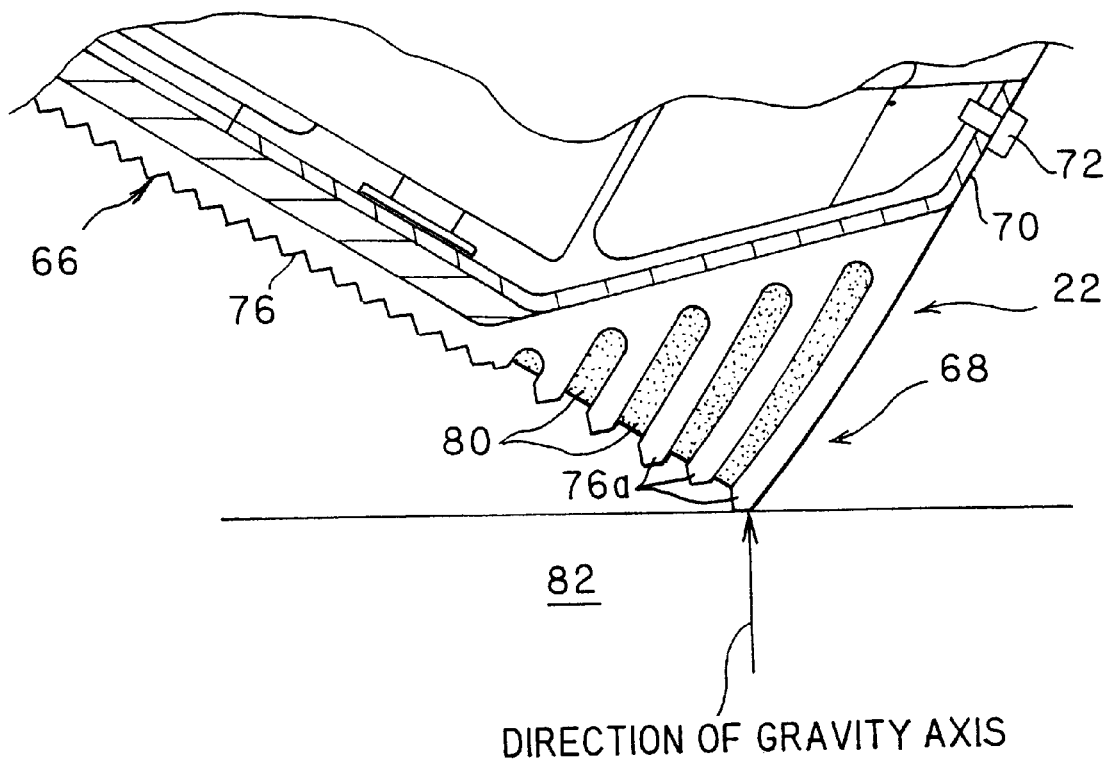
FIG. 6 is a partial side view of the foot illustrated in FIG. 1 showing how the heel meets the floor surface.

The explanation will be continued with reference to FIG. 6. FIG. 6 is a side view showing how the heel 68 meets the floor surface 82 during landing of a foot 22 of the robot 1.

As illustrated, the flat central portion 66 is maintained at a certain angle to the floor surface 82 during footfall so that the heel 68 lands first. The heel 68, therefore, experiences a force in a direction other than the gravity axis, specifically a force acting in the longitudinal direction of the foot. This force (the ground reaction force) produces a landing impact or shock due to floor reaction force acting from the floor to the robot 1.

As mentioned earlier, in this embodiment the projections 76a are formed to have high rigidity against forces acting along the gravity axis and low rigidity against forces acting in other directions and the gaps between the projections 76a are charged with the packings 80 composed of a less rigid material.

Therefore, since the foot 22 of the robot 1 lands on the floor surface 82 from a direction other than that of the gravity axis, the projections 76a readily squeeze and deform the packings 80 to absorb and mitigate the shock at footfall. Then, following landing, the flat central portion 66 of the foot 22 shifts to a position lying parallel to the floor surface 82 so that the weight of the robot 1 is borne by the projections 76a. Since the projections 76a are constituted to have higher rigidity against forces in the gravity axis direction than against forces in other directions, they can reliably support the weight of the robot 1. The attitude of the robot 1 can, therefore, be stably maintained following footfall.

With this, the foot structure of a legged walking robot of this embodiment achieves an optimum balance between two mutually incompatible requirements. Namely, it can readily deform to absorb and mitigate the impact arising at footfall and can exhibit a degree of rigidity suitable for ensuring attitude stability after footfall.

Figure 7:
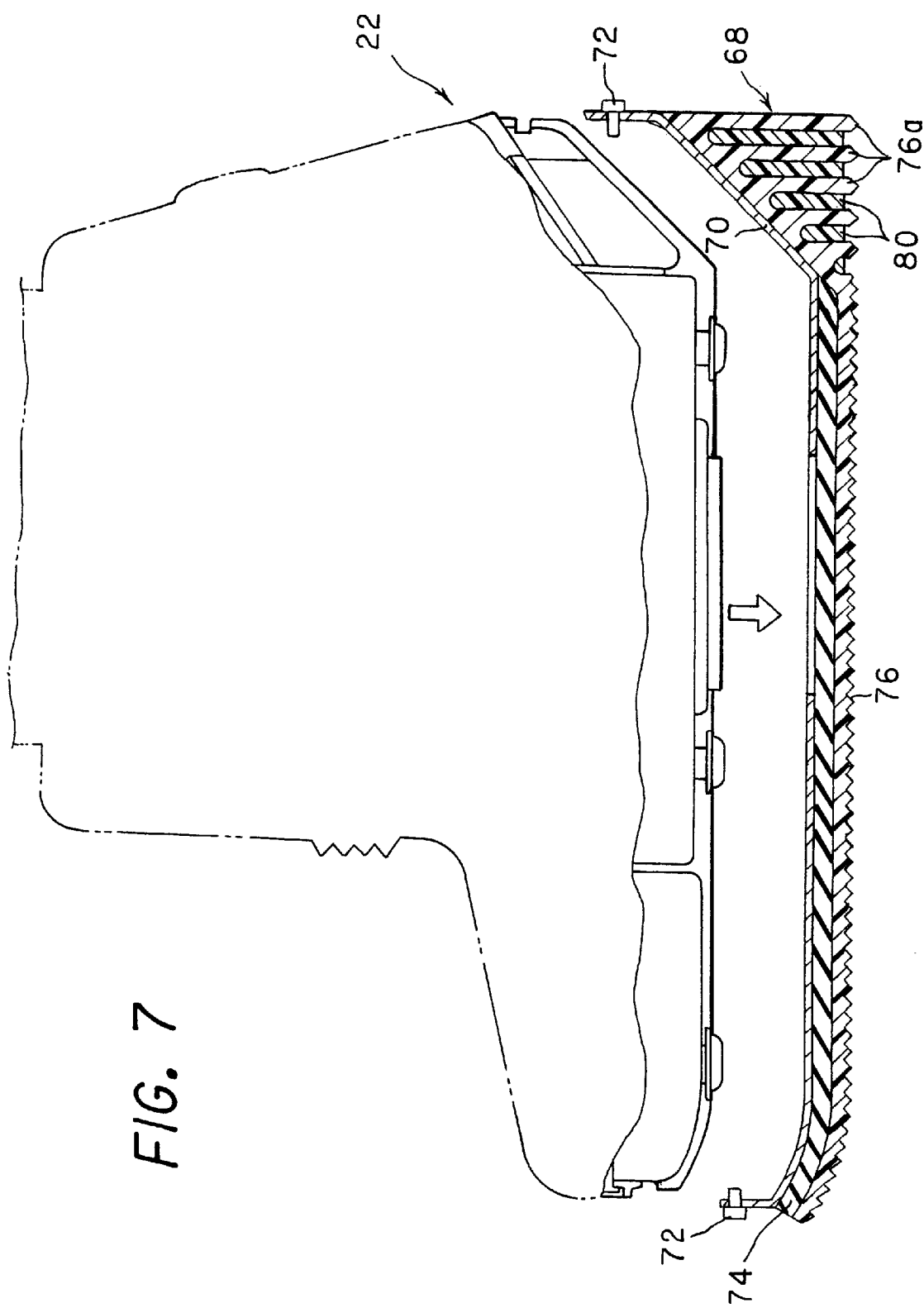
FIG. 7 is a view, similar to FIG. 5, but showing a portion of the sole which is detachable from the foot.

Moreover, in this embodiment the plate 70 is detachably fastened by screws 72 in the vicinity of the toe tip 64 and the heel 68. As shown in FIG. 7, the plate 70 and the first and second elastic members 74, 76 provided on the outside thereof can be easily detached along with the heel 68 including the packings (first member) and the projections (second member) 76a. In other words, at least a portion of the sole of the foot including the first member and the second member is detachable.

Therefore, when the first and second elastic members 74, 76, particularly the second elastic member 76 having the heel 68 composed of projections 76a and the packings 80, become worn through long use, for instance, they can be easily replaced. This ease of replacement is also advantageous from the point of changing the projections 76a and the packings 80 to ones with optimum properties for the robot used environment.

Figure 8:
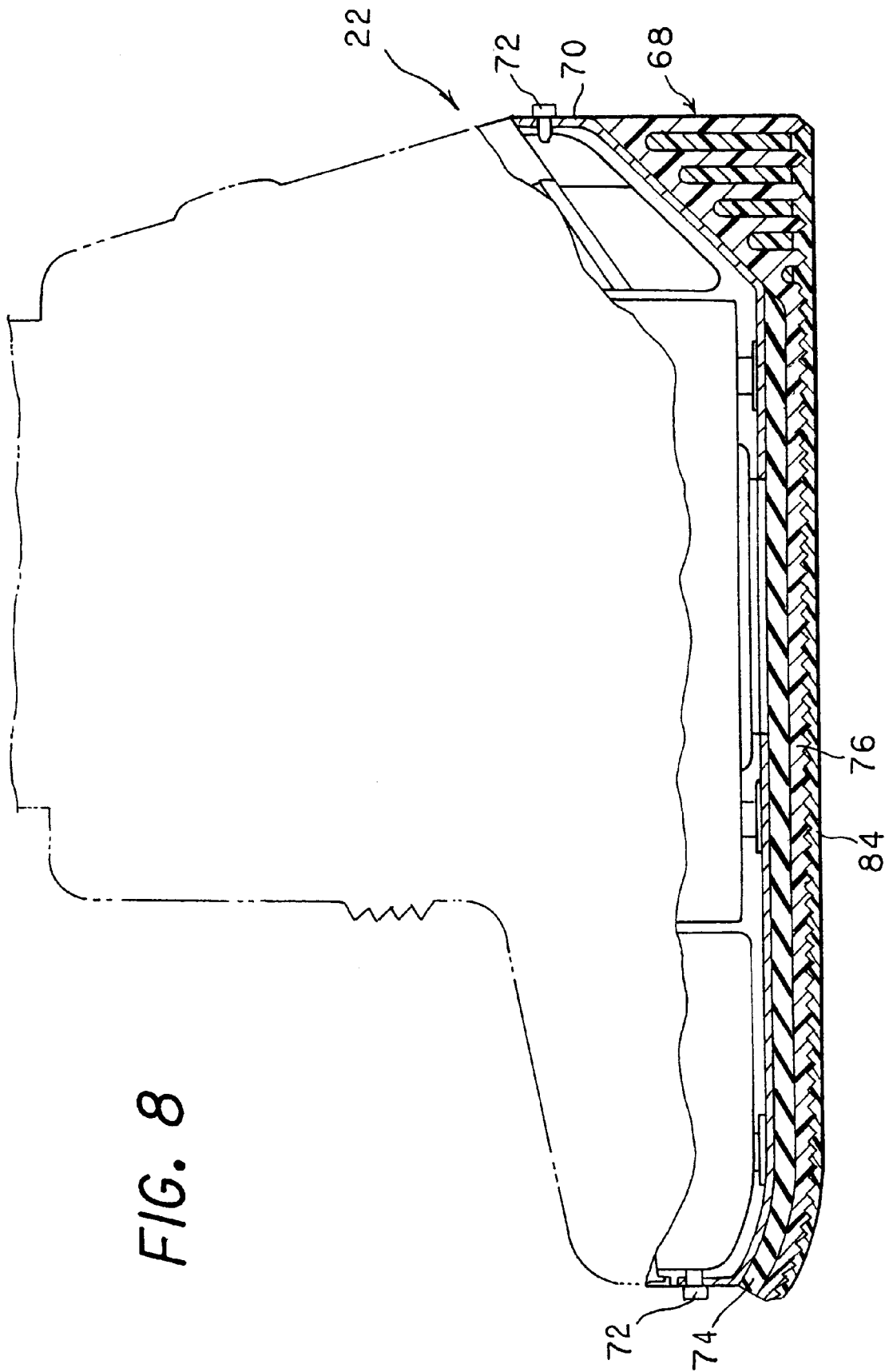
FIG. 8 is a view, similar to FIG. 5, but showing the sole of the foot of a legged walking robot according to a second embodiment of the invention.

FIG. 8 is a sectional view of a foot 22 similar to that of FIG. 5 showing a legged walking robot, more particularly the foot structure of a legged walking robot according to a second embodiment of the invention. Members common with those of the first embodiment are assigned like reference symbols and will not be explained again.

In this second embodiment, the second elastic member 76, including the portion of the heel 68, is covered with a third elastic member 84 composed of an elastic material.

This configuration enables the second embodiment of the foot structure of a legged walking robot to achieve the same effects and advantages as the first embodiment. In other respects, the structure of the second embodiment as well as the effects and advantages are the same as the first.

Figure 9:
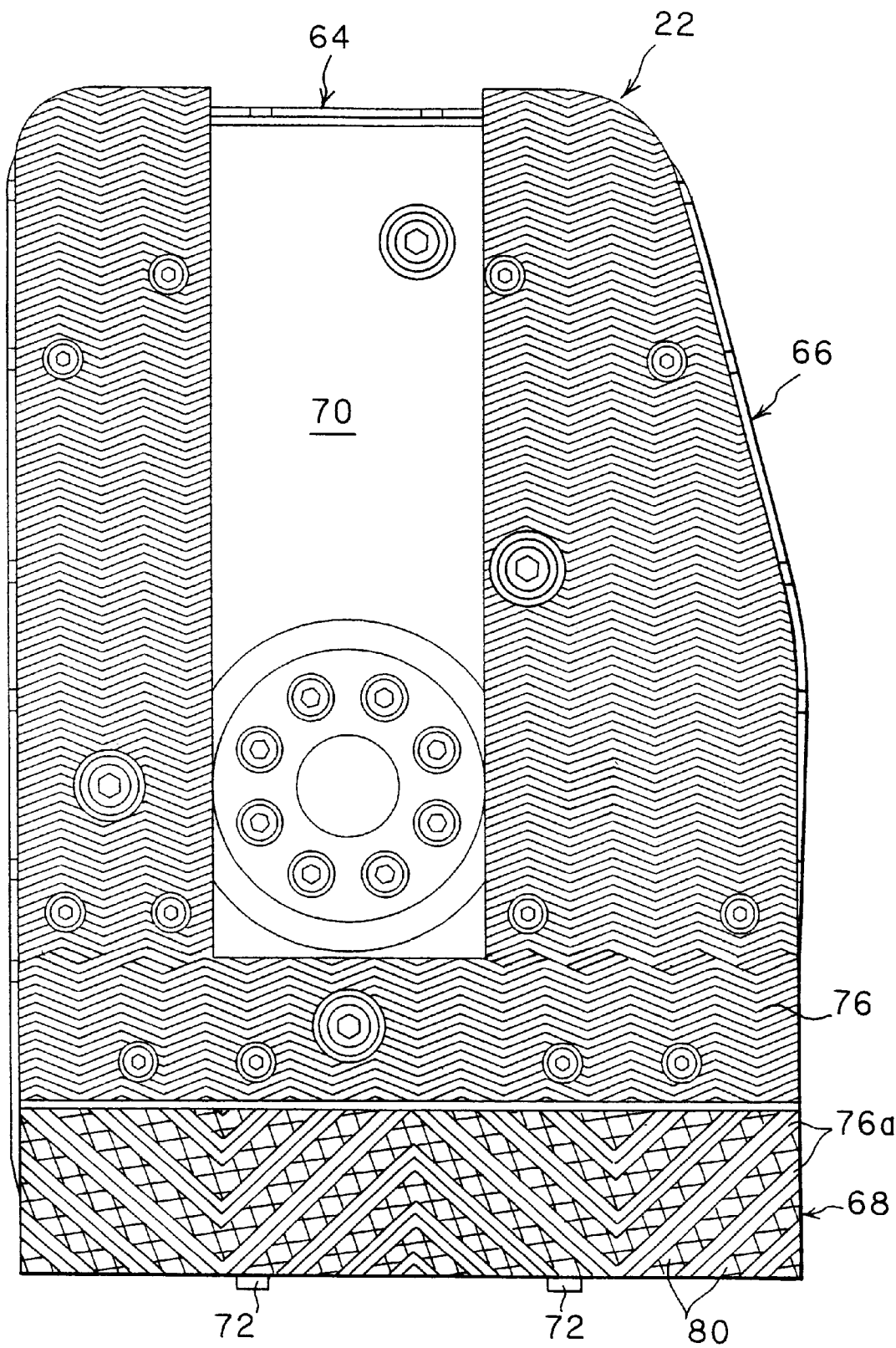
FIG. 9 is a view, similar to FIG. 4, but showing the sole of the foot of a legged walking robot according to a third embodiment of the invention.

FIG. 9 is a bottom view of a foot structure similar to that of FIG. 4 showing a legged walking robot, more particularly, the foot structure of a legged walking robot according to a third embodiment of the invention. Members common with those of the first embodiment are assigned like reference symbols and will not be explained again.

The point of difference from the first embodiment will be explained. As shown in FIG. 9, in foot 22 of the third embodiment, the projections 76a do not appear as straight lines but are configured to be lines of a non-linear series, more specifically as zigzagged lines or W-shaped when viewed from the sole (bottom) as in FIG. 4.

By increasing the ground contact area of the projections 76a, this configuration in the third embodiment enables the same features, effects and advantages to be achieved as the first embodiment while also providing the effects and advantages of further enhancing attitude stability after footfall. In other respects, the structure of the third embodiment as well as the effects and advantages are the same as the first.

Although a zigzag shape was given as an example of a continuous nonlinear shape as viewed from the sole (bottom), other patterns, including V-shaped, U-shaped and wavy, can be adopted instead. Any pattern that increases the ground contact area of the projections 76a will do.

Figure 10:
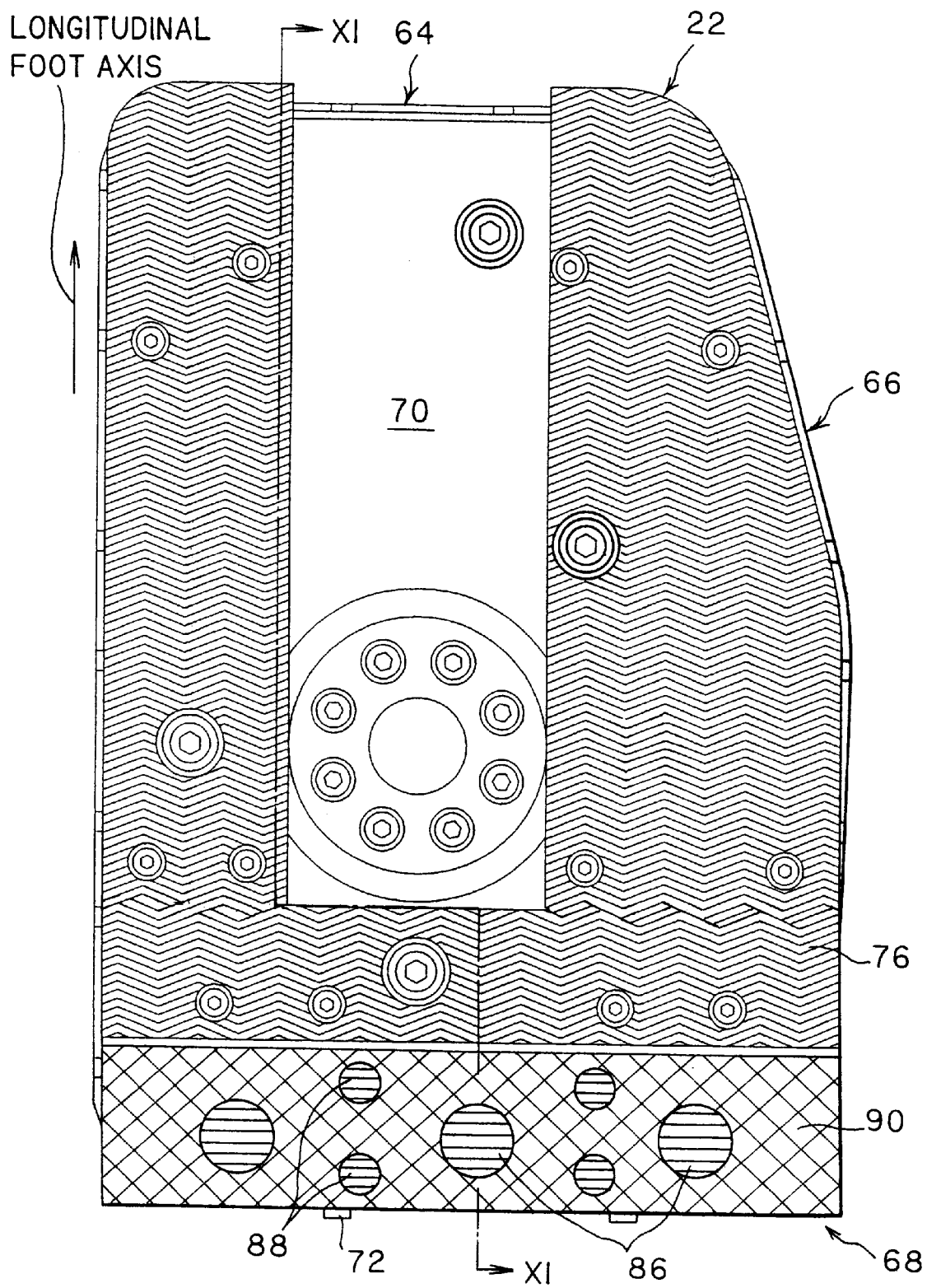
FIG. 10 is a view, similar to FIG. 4, but showing the sole of the foot of a legged walking robot according to a fourth embodiment of the invention.
Figure 11:
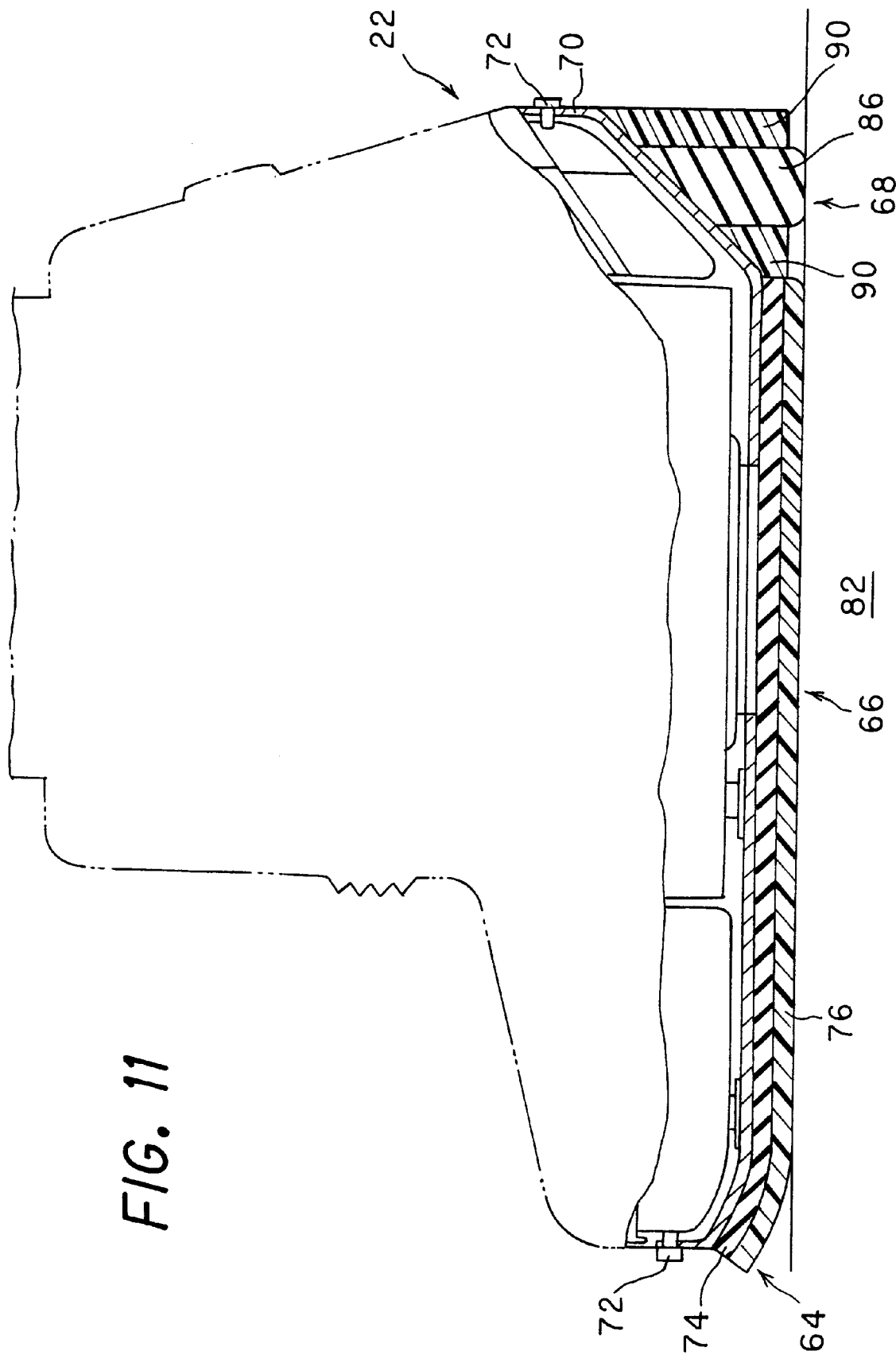
FIG. 11 is a sectional view taken along line XI—XI of FIG. 10.

FIG. 10 is a bottom view of a foot structure similar to that of FIG. 4 showing a legged walking robot, more particularly, the foot structure of a legged walking robot according to a fourth embodiment of the invention. FIG. 11 is a sectional view taken along line XI—XI of the foot of FIG. 10. Members common with those of the first embodiment are assigned like reference symbols and will not be explained again.

The point of difference from the first embodiment will be explained. In the fourth embodiment, a plurality of cylindrical projections 86, 88 are formed to project from the plate 70 at the heel 68. In other words, the projections 86, 88 are configured to be posts.

Like the projections 76a of the first embodiment, the projections 86, 88 are formed to make angles of substantially 90 degrees with respect to the flat central portion 66. In other words, the projections 86, 88 are formed to protrude parallel with the gravity axis toward the floor surface 82 on which the foot 22 lands. This is to maximize the rigidity of the projections 86, 88 against the forces acting thereon in the gravity axis direction and to lower their rigidity against forces acting in other directions.

The projections 86 are larger in diameter than the projections 88. Three are disposed laterally at equal spacing and projections 88 are disposed between each adjacent pair. Filler 90 is charged (disposed) around the projections 86, 88. The projections 86, 88 and the filler 90 are made of the same materials as the projections 76a and the packings 80 of the first embodiment.

The heels 68 of the first to third embodiments are structured to reduce rigidity against forces in directions other than the gravity axis direction, particularly in the longitudinal direction of the foot. So long as the foot lands in the prescribed direction parallel to the longitudinal axis of the foot, therefore, the shock at footfall can be thoroughly absorbed and mitigated. When the floor surface 82 has unexpected irregularities, however, a force may be produced in a different direction from the prescribed one (such as laterally). In such a case, the shock cannot be thoroughly absorbed and mitigated.

Taking this into account, the foot structure according to the fourth embodiment provides the projections 86, 88 in a mutually spaced, studded arrangement. As a result, even if forces acting in other than the prescribed one (laterally, for instance) should occur, the shock they produce can be thoroughly absorbed and mitigated. In other respects, the structure of the fourth embodiment as well as the effects and advantages are the same as the first.

Although the projections 86, 88 of the fourth embodiment are cylindrical, they can be in any other post shape such as polygonal instead. Moreover, the number and positioning of the projections 86, 88 are not limited to those of the illustrated example.

Having been configured in the foregoing manner, the embodiments provide a legged walking robot (1) having at least a body (3) and a plurality of legs (2) each connected to the body and each having a foot (22R, L) at its free end such that the robot is controlled to walk by landing a heel (68) of the foot (22R, L) first on a floor, characterized in that the heel (68) of the foot (22R, L) is constituted of a first member (80, 90) made of a first rigid material and a second member (76a, 86, 88) made of a second rigid material, and the second member (76a, 86, 88) is constituted to have a first rigidity against forces acting in a direction of gravity axis and a second rigidity, which is lower than the first rigidity, against forces acting in a direction other than the direction of gravity axis, when the heel (68) is landed.

With this, at footfall, therefore, the foot can effectively absorb and mitigate shock to ensure smooth landing, and can also ensure maintenance of attitude stability in the standing state. This, therefore, provides a foot structure that enables a legged walking robot, particularly a biped walking robot, to achieve an optimum balance between absorption/mitigation of footfall shock and attitude stabilization after footfall.

In the legged walking robot, the first material is less in hardness than the second material, and the second member comprises a group of projections (76a, 86, 88) projected outwardly from the sole and the first member (80, 90) is charged into gaps between the projections, which enables a legged walking robot, particularly a biped walking robot, to further optimize balance between absorption/mitigation of footfall shock and attitude stabilization after footfall.

In the legged walking robot, the second member comprises a group of projections (76a, 86, 88) projected outwardly from the sole and the first member (80, 90) is charged into gaps between the projections, which enables a legged walking robot, particularly a biped walking robot, to further optimize balance between absorption/mitigation of footfall shock and attitude stabilization after footfall.

In the legged mobile robot, the projections (76a) are configured to be comb teeth like when viewed in vertical section and are configured to be lines of a non-linear series when viewed from a sole of the foot, which owing to increased ground contact area of the non-linear series pattern, can ensure even further enhanced maintenance of attitude stability in the standing state.

In the legged mobile robot, the projections (86, 88) are configured to be posts, enabling effective absorption and mitigation of footfall impact even when an unexpected irregularity in the floor surface produces a force at footfall that acts in a direction other than the normal direction, such as in the lateral direction of the foot.

In the legged mobile robot, at least a portion of a sole of the foot including the first member (80, 90) and the second member (76a, 86, 88), more precisely a plate (70) carrying the same, is detachable, which enables easy replacement of the members (76a, 80, 86, 88, 90) when necessary owing to, for example, long use.

In the legged mobile robot, a sole of the foot is covered by an elastic member (84) made of an elastic material, which provides the same features and effects as the foregoing.

It should be noted that, although a biped walking robot was taken as an example of a legged walking robot in the foregoing explanation, this is not limitative and the invention also applies to any of various other types of legged walking robots.

While the invention has thus been shown and described with reference to specific embodiments, it should be noted that the invention is in no way limited to the details of the described arrangements but changes and modifications may be made without departing from the scope of the appended claims.

What is claimed is:

1. A legged walking robot having at least a body and a plurality of legs each connected to the body and each having a foot at its free end such that the robot is controlled to walk by landing a heel of the foot first on a floor, wherein the improvement comprises:

the heel of the foot including a first member made of a rigid material and a second member made of a rigid material, the second member having a first rigidity against forces acting in a direction of a gravity axis and a second rigidity lower than the first rigidity against forces acting in a direction other than the direction of the gravity axis when the heel is landed, the second member comprising a group of projections protruding from a sole parallel to the gravity axis and protruding laterally on the sole, wherein the first member is charged into gaps between the projections.

2. A legged walking robot according to claim 1, wherein the first member is less in hardness than the second member.

3. A legged walking robot according to claim 1, wherein the first member is charged such that an outer surface of the first member is countersunk relative to ends of the projections.

4. A legged mobile robot according to claim 1, wherein the projections configured to be a comb teeth when viewed in vertical section and are configured to be lines of a linear series when viewed from the sole of the foot.

5. A legged mobile robot according to claim 2, wherein the projections are configured to be a comb teeth when viewed in vertical section and are configured to be lines of a linear series when viewed from the sole of the foot.

6. A legged mobile robot according to claim 3, wherein the projections are configured to be a comb teeth when viewed in vertical section and are configured to be lines of a non-linear series when viewed from the sole of the foot.

7. A legged mobile robot according to claim 1, wherein the projections are configured to be posts.

8. A legged mobile robot according to claim 3, wherein the projections are configured to be posts.

9. A legged mobile robot according to claim 1, wherein at least a portion of the sole of the foot including the first member and the second member is detachable.

10. A legged mobile robot according to claim 2, wherein at least a portion of the sole of the foot including the first member and the second member is detachable.

11. A legged mobile robot according to claim 3, wherein at least a portion of the sole of the foot including the first member and the second member is detachable.

12. A legged mobile robot according to claim 1, wherein the sole of the foot is covered by an elastic member made of an elastic material.

13. A legged mobile robot according to claim 2, where in the sole of the foot is covered by an elastic member made of an elastic material.

14. A legged mobile robot according to claim 3, wherein the sole of the foot is covered by an elastic member made of an elastic material.

* * * * *

UNITED STATES PATENT AND TRADEMARK OFFICE
CERTIFICATE OF CORRECTION

PATENT NO.     : 6,377,014 B1
DATED          : April 23, 2002
INVENTOR(S)    : Gomi et al.

It is certified that error appears in the above-identified patent and that said Letters Patent is hereby corrected as shown below:

<u>Column 8,</u>
Line 59, change "where in" to -- wherein --.

Signed and Sealed this

Third Day of September, 2002

*Attest:*

*Attesting Officer*

JAMES E. ROGAN
*Director of the United States Patent and Trademark Office*